Jan. 21, 1930. A. C. HIRSCH ET AL 1,744,224
TREAD CUTTING MACHINE
Filed April 11, 1927 8 Sheets-Sheet 1

Jan. 21, 1930. A. C. HIRSCH ET AL 1,744,224
TREAD CUTTING MACHINE
Filed April 11, 1927   8 Sheets-Sheet 5

Jan. 21, 1930.　　A. C. HIRSCH ET AL　　1,744,224
TREAD CUTTING MACHINE
Filed April 11, 1927　　8 Sheets-Sheet 6

Inventors
Alfred C Hirsch
Arnold R. Krause
by Charles H. Kelly
Attys

Patented Jan. 21, 1930

1,744,224

UNITED STATES PATENT OFFICE

ALFRED C. HIRSCH AND ARNOLD R. KRAUSE, OF EAU CLAIRE, WISCONSIN, ASSIGNORS TO GILLETTE RUBBER COMPANY, A CORPORATION OF WISCONSIN

TREAD-CUTTING MACHINE

Application filed April 11, 1927. Serial No. 182,705.

This invention relates to a tread measuring and cutting machine intended to cut measured lengths of stock from a continuous length of material.

It is an object of this invention to provide an improved feeding and cutting mechanism of the class described wherein the end of a long length of material will be intermittently advanced a predetermined and adjustable amount and will then be cut off by a traversing mechanism also intermittently operated by a drive common to the feeding mechanism to time the movement thereof in proper sequence.

It is also an object of this invention to provide a device of the class described having an intermittently moving cutter traversing mechanism having a relatively slow cutter traversing motion with a quick return motion in order that the time of a complete cycle can be reduced while maintaining the desirable moderate cutting speed.

It is another object of this invention to provide an improved machine for the purpose described having an intermittent feed for the stock adapted to feed the material a predetermined amount, with means to reduce the back lash when adjusting the feed and to prevent overrunning at the end of the feeding movement to produce accurately measured feeding of the stock.

It is also another object of this invention to provide an improved device of the class described having means for quickly and easily adjusting the speed thereof while in operation to keep the device in step with the production of the material being cut into lengths.

It is still another object of this invention to provide an improved cutting mechanism having means to feed the material against the cutters to prevent bunching thereof and to insure a smooth even cut.

Other and further important objects of this invention will be apparent from the disclosures in the specification and the accompanying drawings.

This invention (in a preferred form) is illustrated in the drawings and hereinafter more fully described.

Figure 1:
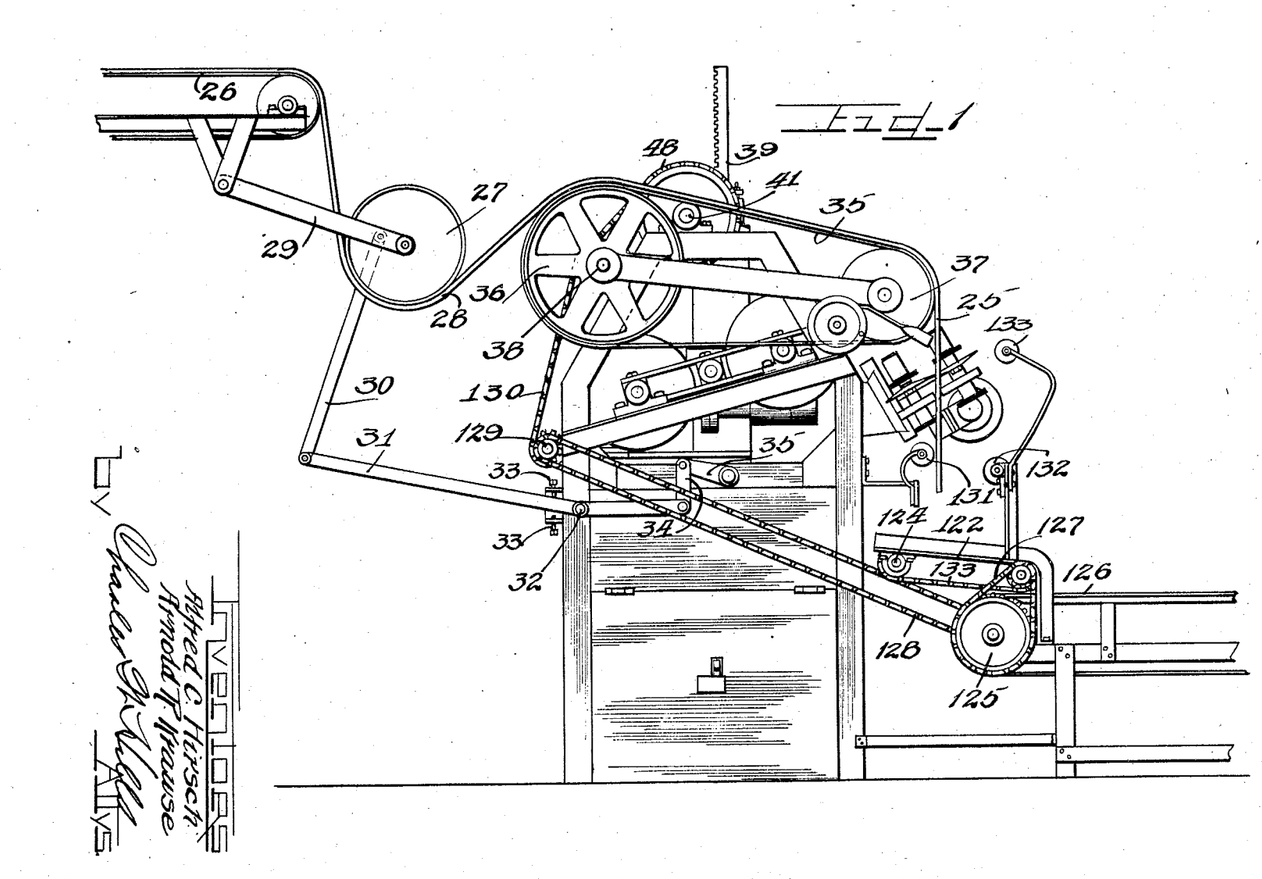
Figure 1 is a side elevation of a machine embodying the features of this invention.

The machine as shown in Figure 1 is particularly designed to receive long or continuous lengths of tread stock 25 used in manufacturing pneumatic tires, the stock being delivered on an overhead conveyor 26 with an idler pulley 27 riding on the slack loop 28 of the stock, the pulley being carried by the pivoted arm 29 which is linked by a rod 30 to a lever 31 pivoted at 32 and having adjustable stops 33 limiting its motion in either direction from the position shown. The lever 31 is connected by a short link 34 to a crank 35 actuating an ordinary stop and start switch for the driving mechanism.

Figures 6, 7, 9, 10:
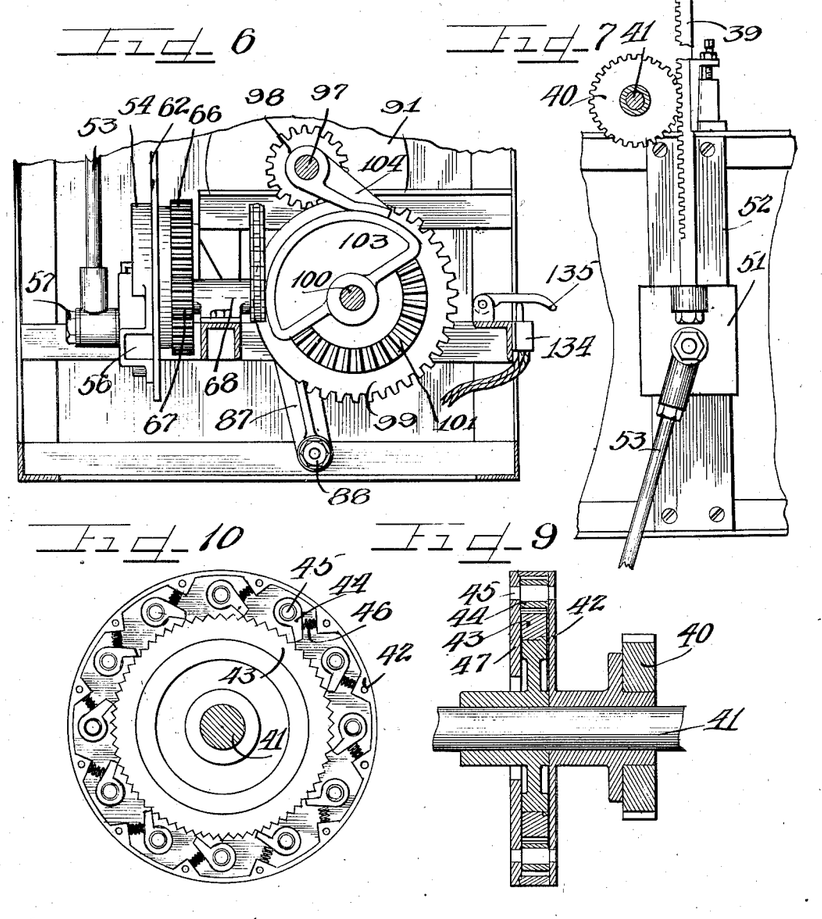
Figure 6 is a fragmentary section on the line VI—VI of Figure 5.
Figure 7 is a fragmentary section on the line VII—VII of Figure 4.
Figure 9 is a fragmentary section on the line IX—IX of Figure 3.
Figure 10 is a left side view of Figure 9 with the cover removed.

The stock passes over an endless belt 35 supported on the pulleys 36 and 37, the pulley 36 being rotated a predetermined adjustable amount to advance the stock the required length after each preceding section has been cut off. As each section must be cut accurately to the length the machine is adjusted for, the intermittent drive for the pulley 36 which is mounted on the shaft 38 comprises a reciprocating rack 39 engaging a gear 40 freely mounted on a shaft 41 as best shown in Figures 9 and 10, this gear 40 carrying a housing 42 concentric with and revolving about a ratchet gear 43 keyed to the shaft 41. The housing 42 contains a number of ratchet pawls 44 on stub shafts 45 with springs 46 backing the pawls, a cover 47 closing the open side of the housing and providing supports for the outboard ends of the stub shafts 45. The pawls and ratchet gear provide a one way drive for the shaft 41 and to increase the accuracy thereof beyond the limits imposed by the ratchet tooth spacing, the pawls are arranged with an unequal spacing so that the backlash is limited to the tooth spacing divided by the number of pawls, one of the pawls being at all times within this distance from a ratchet tooth. The shaft 41 drives the pulley shaft 38 by means of the chain 48, no reference numerals being applied to the chain sprockets on the drawings to avoid a confusing mass of reference characters. In order to prevent overrunning of the belt and pulleys, which would be possible with the one direction drive, a brake drum 49 and adjustable brake shoes 50 are provided on the shaft 41 to set up the required frictional resistance to prevent overrunning and thus insure accuracy of the measuring mechanism. Also this brake prevents the weight of the pulley riding in the slack loop of material from pulling the material backwardly when the feeding mechanism is on the return stroke.

Figure 3:
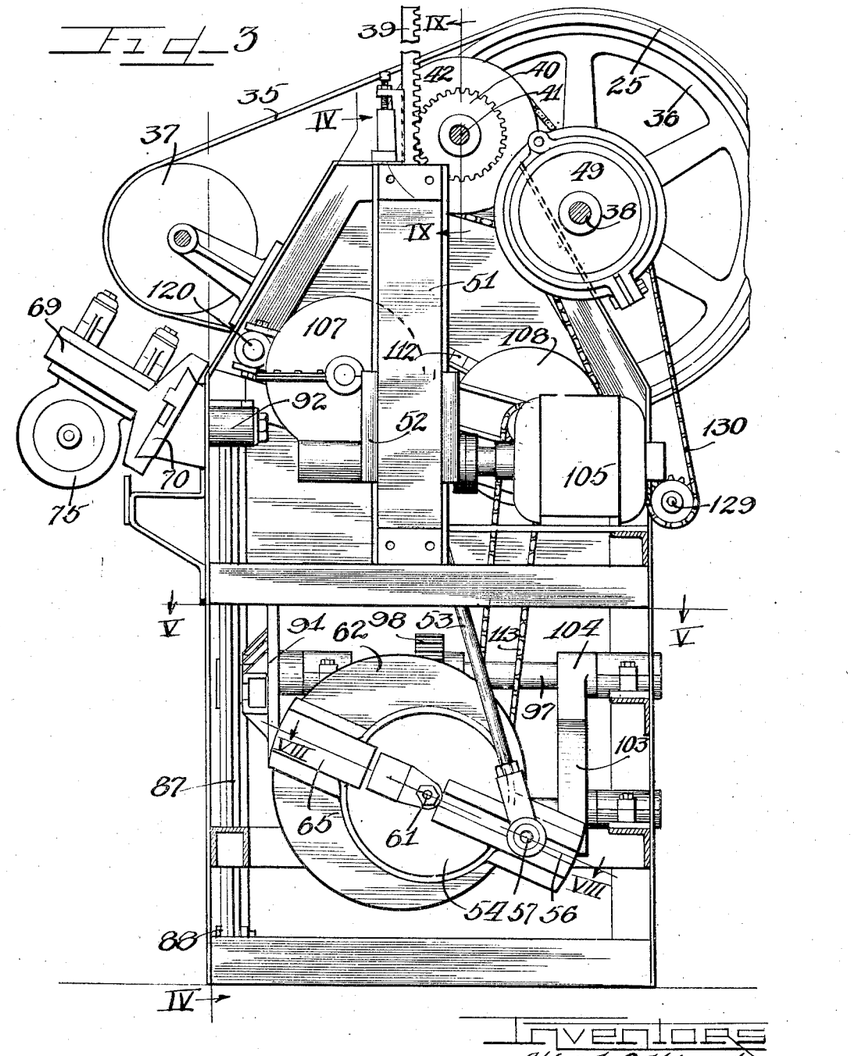
Figure 3 is a section on the line III—III of Figure 4, representing the reverse side of Figure 1 with the enclosure removed.
Figure 8:
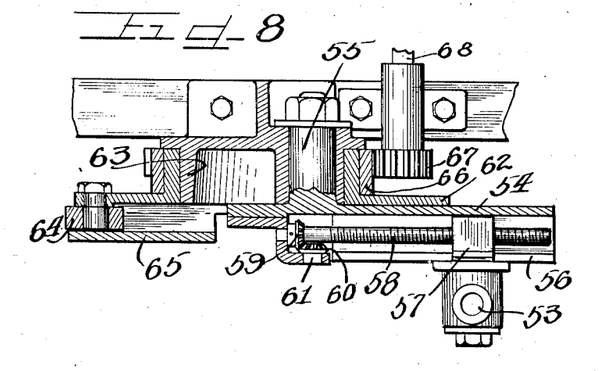
Figure 8 is a fragmentary section on the line VIII—VIII of Figure 3.

The rack 39 is mounted on a shoe 51 sliding on a vertical guide bar 52, the shoe being reciprocated on the bar by means of a connecting rod 53 extending to an adjustable radius crank mechanism, shown in elevation in Figure 3 and in section in Figure 8. This crank mechanism comprises a plate 54 rotating on its axle 55 and having a slide 56 for the crank pin 57 actuating the rod 53, the crank pin 57 being adjustable in and out by means of the screw 58 within the slide and adjustable by means of the bevel gears 59 and 60, the latter being in the axis of the plate and externally operable by means of a suitable tool insertable in the hexagon socket 61 formed in the exposed face thereof. The plate 54 is rotated at a non-uniform rate, to provide a relatively slow power stroke for feeding the material with a relatively quick idle or return stroke, by means of an annular disc 62 rotating on an eccentric boss 63 which also supports the plate axle 55, the disc 62 carrying a roller 64 which engages in a track member 65 integral with the plate 54 and disposed diametrically opposite to the slide 56, the disc 62 carrying a ring gear 66 engaged by a pinion 67 on the shaft 68; the disc thus having a uniform angular speed of rotation, while the crank slide has a decreased angular speed in the position shown in Figure 8 and an increased angular speed in a position at 180 degrees therefrom.

The cut off mechanism comprises a sliding carriage 69 on angularly positioned ways 70 on the right side of Figure 1 and separately in Figures 15 to 20. The carriage ways 70 are shown as mounted at the proper angle to produce the desired angle of scarf in lengths of tread stock for pneumatic tires, but for other purposes the carriage could be mounted to produce a square cut end without in any way altering the structure thereof. The cutter mechanism proper comprises a pair of rotating shear blades 71 separately mounted on the arms 72 of the carriage 69 and driven by chains 73 from sprocket shafts 74 having a common drive from a motor 75 through a reduction worm gearing 76 and a gear 77 meshing directly with a gear 78 associated with one of the sprocket shafts 74 with an idler pinion 79 driving a gear 80 associated with the other sprocket shaft to produce the desired opposed motion of the rotory shear blades 71.

In order to avoid the bunching or pushing aside of the material to be cut while the rotating shears are advanced thereacross, a pair of feeding rollers 81 are separately mounted on levers 82 pivoted on the arms 72 and adjustable with respect thereto by the set screws 83, these feed rollers being positioned slightly in advance of the shear blades 71 and are driven by chains 84 which extend to sprockets 85 on the same shafts 74 which carry the driving sprockets and driving gears for the shear blade driving chains 73.

Figure 4:
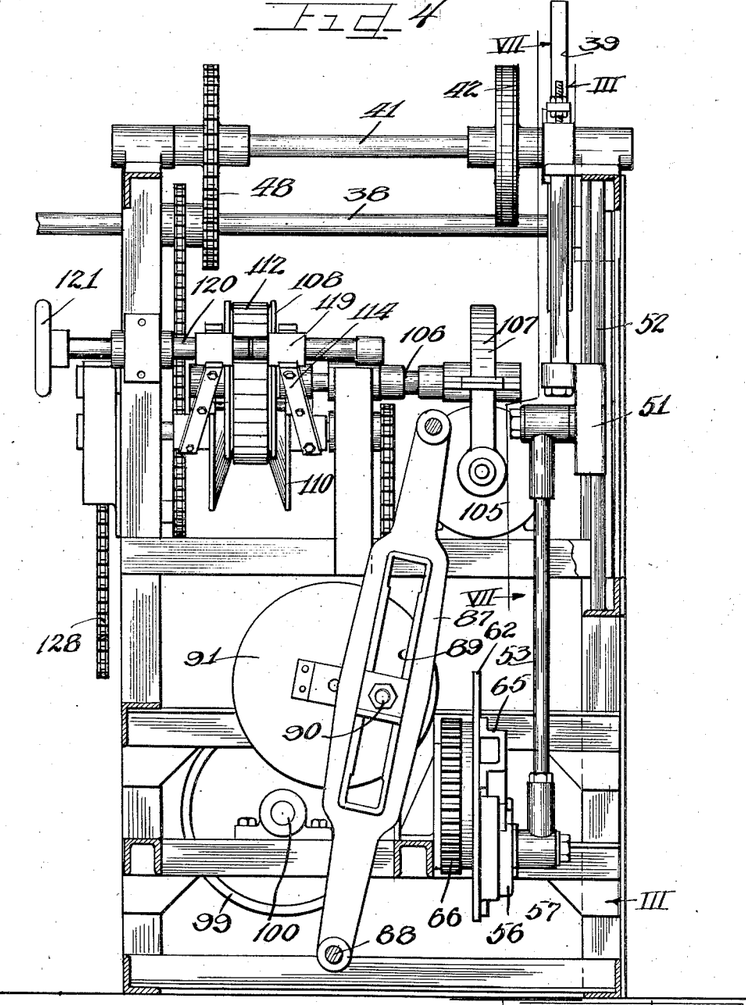
Figure 4 is a section on the line IV—IV of Figure 3 representing a front or delivery end view, with the cutting mechanism removed.
Figure 5:
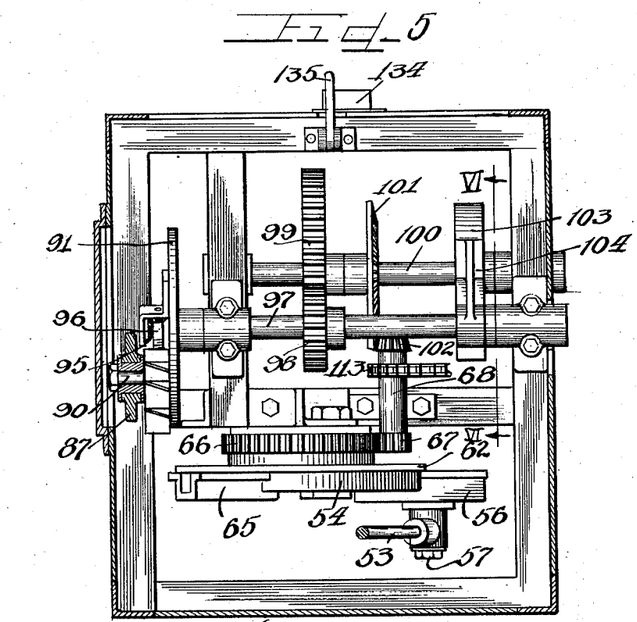
Figure 5 is a section on the line V—V of Figure 3.
Figures 19, 21:
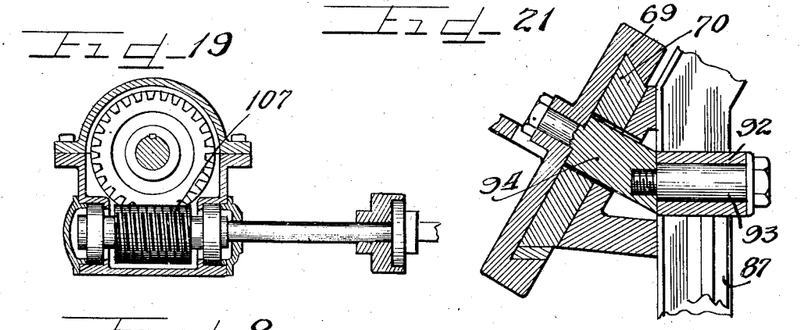
Figure 19 is a section on the line XIX—XIX of Figure 17.
Figure 21 is a section on the line XXI—XXI of Figure 16.
Figure 20:
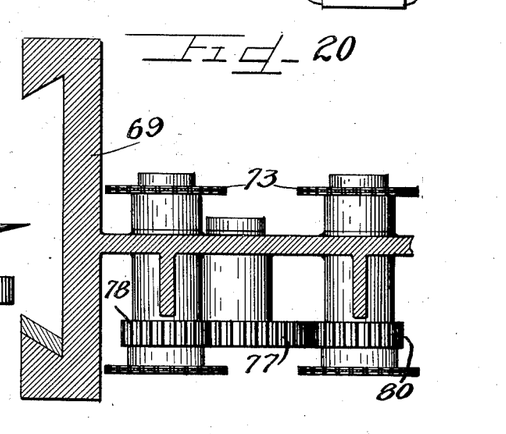
Figure 20 is a section on the line XX—XX of Figure 16.

The cutter carriage 69 is traversed or reciprocated on its ways by an adjustable throw slide link mechanism producing a slow cutting traverse with a quick return, this mechanism comprising a slide link or lever 87 pivoted at 88 and having a crank guideway 89 in which a crank pin 90 slides up and down as it rotates on the face of a disc 91 as shown in Figures 4 and 5. The upper end of the slide link 87 has a short link 92 connecting to a stud 93 in the boss 94 which passes through a slot in the carriage guide way 70 and is fastened to the carriage 69 as shown in Figure 21. The crank pin 90 is radially adjustable on the disc 91 in the same manner as the crank pin 57, the screw 95 and bevel gears 96 shown in perspective in Figure 5 corresponding to the screw 58 and gears 59 and 60 shown in Figure 8. This arrangement of crank pin and sliding link provides a reduced speed of swing of the link when the crank pin is swinging over the upper half of its travel, with a correspondingly increased speed of the return movement on the lower half because of the change in the leverage of the crank pin relative to the slide link. This variable speed feature produces a slower movement of the carriage 69 during the severing or cutting movement with a quick return movement of the carriage, thus permitting the reduction of the time required for the complete cycle, without increasing the cutting speed. The adjustable throw of the crankpin 90 permits adjustment of the carriage travel to suit the width of the material being cut, thus permitting increasing the speed of the whole machine when cutting narrow stock.

The crank pin disc 91 is mounted on the end of a shaft 97 which is intermittently driven by a pair of mutilated gears 98 and 99 from the shaft 100, which in turn is driven at constant speed by a bevel gear 101 and a pinion 102 on the shaft 68 described in connection with the material feeding mechanism. The mutilated gears 98 and 99 are caused to mesh properly by a cam 103 and cam follower 104 on the shafts 100 and 97 respectively, the purpose of the mutilated gears being to hold the carriage stationary during the material feeding operation as the carriage should preferably cut off the stock and return to its initial position during the period of the return or free stroke of the feeding mechanism, rather than to operate in a cycle of the same time period as that of the feeding mechanism.

Figures 2, 11, 12:
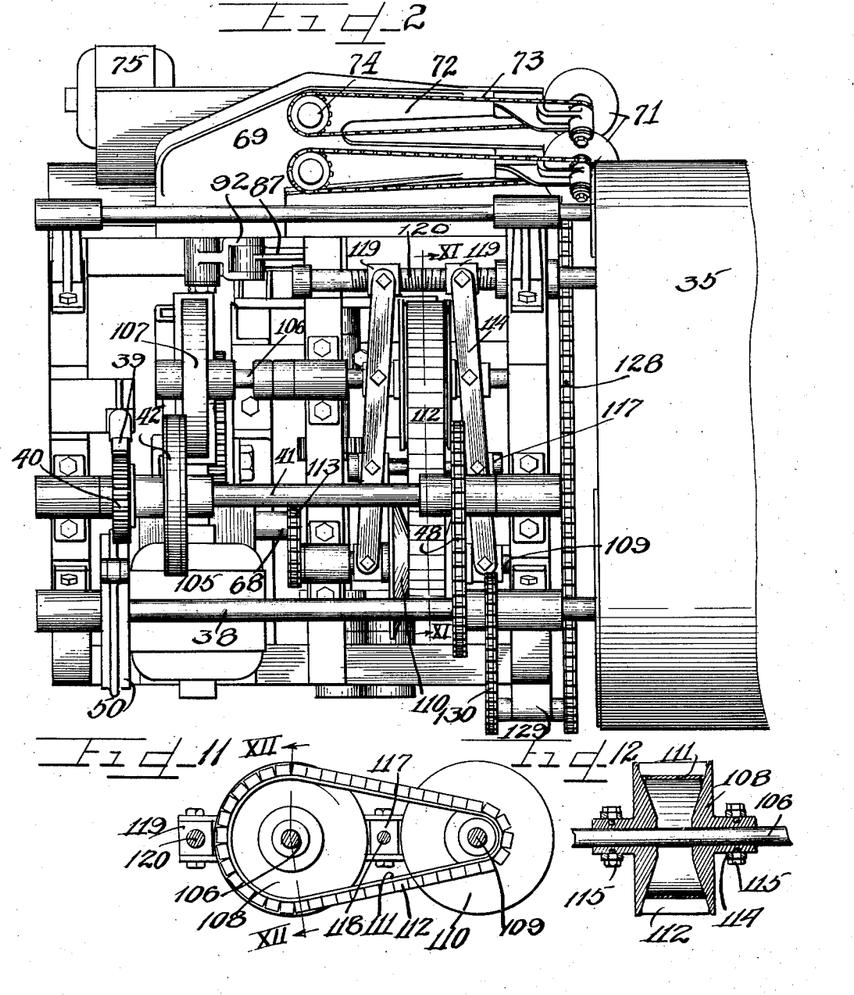
Figure 2 is a top view thereof.
Figure 11 is a section on the line XI—XI of Figure 2, showing the variable speed drive.
Figure 12 is a section on the line XII—XII of Figure 11.

In describing the driving mechanism for the shaft 68 it is considered desirable to trace the drive starting from the motor 105. This motor drives a shaft 106 through reduction worm gearing 107, the shaft 106 carrying a pair of opposed conical face plates 108 slidably keyed thereto. A second parallel shaft 109 carries a second pair of opposed conical face plates 110 similar to those on shaft 106; a belt or web 111 having a series of blocks 112 secured thereto being interposed between the faces of the pairs of conical face plates with the ends of the blocks in driving engagement with the face plates due to the wedging action thereof. The two pairs of face plates are arranged to move oppositely to each other, i. e. one pair is moved closer together and the other pair simultaneously moved away from each other to provide a variable speed drive as the belt and blocks will ride farther out on one pair as they are pushed together and correspondingly closer in on the other pair, thus varying the speed ratio between the driving and driven shafts. Figure 11 shows one extreme position giving the maximum speed reduction on the driven shaft 109 which drives the shaft 68 by means of the chain 113. The simultaneous adjustment of the two pairs of conical face plates 108 and 110 is accomplished by means of the two levers 114 engaging the hubs of the face plates at 115 and pivoted at 117 midway therebetween by means of the floating tie bar 118, the levers 114 being extended beyond the shaft 106 to nuts 119 on a right and left hand threaded shaft 120 operated by the hand wheel 121, manual rotation of this shaft in either direction resulting in a simultaneous and opposite movement of the two pairs of face plates 108 and 110 to an equal extent, thus varying the path of the belt 111.

Figure 13:
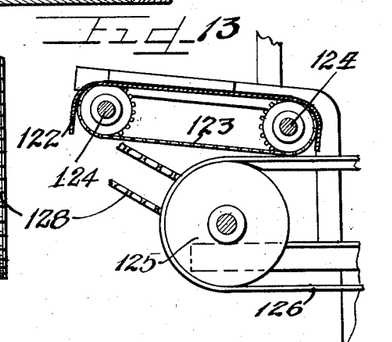
Figure 13 is a fragmentary side elevation of the delivery mechanism for receiving the severed lengths of material.
Figure 14:
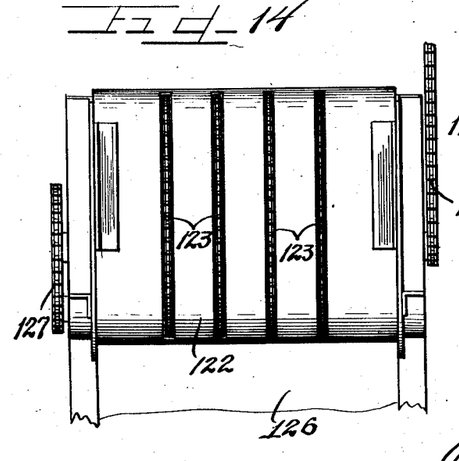
Figure 14 is a top view of Figure 13.
Figure 15:
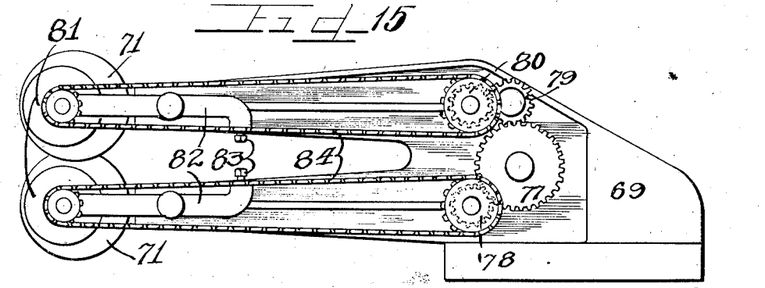
Figure 15 is a view showing the cutter mechanism and carriage alone.
Figure 16:
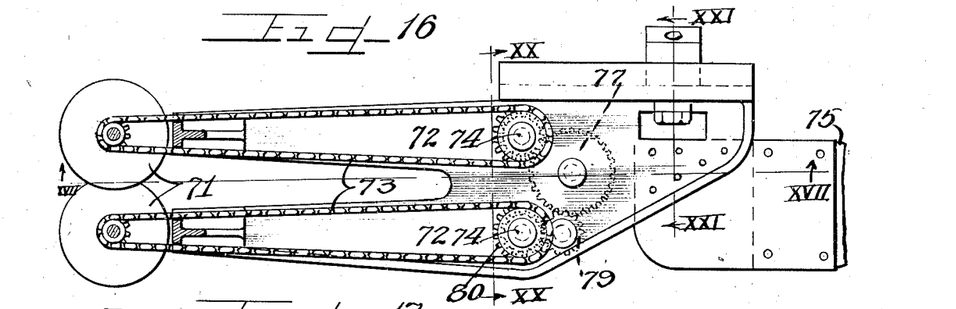
Figure 16 is a section showing the cutter mechanism without the feed rolls.
Figure 17:
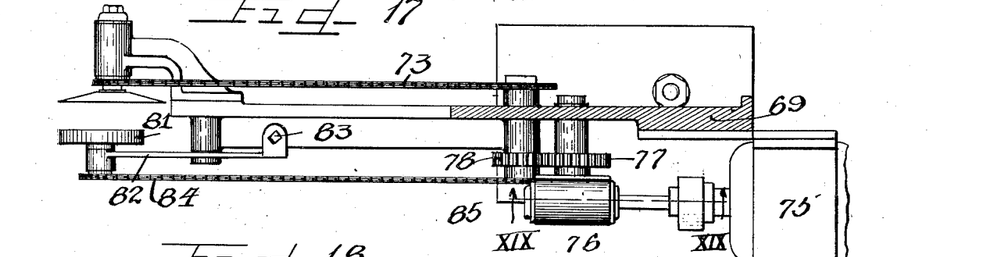
Figure 17 is a section on the line XVII—XVII of Figure 16.
Figure 18:
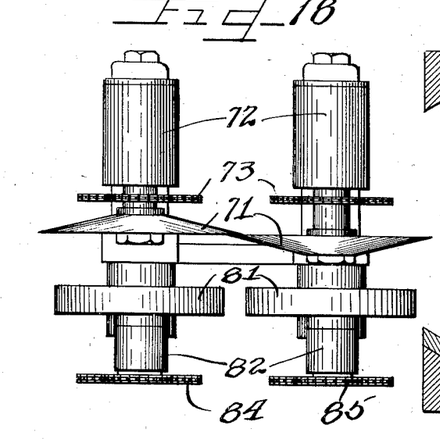
Figure 18 is an end view of the cutters and feed rolls.

A short receiving conveyor is shown in Figures 13 and 14, comprising a stationary apron 122 having slots for four rows of chains running over sprockets 123 on shafts 124, one shaft being driven from the end roll 125 of a belt conveyor 126 by means of a chain 127, the conveyor 126 being driven by a chain 128 leading to a countershaft 129 which in turn is driven by a chain 130 from the measuring belt pulley shaft 38 so that the conveyor is intermittently operated in step with the operation of the measuring mechanism, such synchronism being desirable to prevent the receiving conveyor from pulling the material along and causing overrunning of the measuring belt. Three rolls 131, 132 and 133 are provided above the conveyor to prevent the cut or free end of the material from flopping around and perhaps sticking to some part of the machine due to the tacky nature of the uncured tread rubber stock. An emergency stop switch 134 is provided in the circuit for the motor 105 and operated by a pedal 135, this switch being provided as a cut out.

While the operation of the different elements of the whole machine have been described in connection with the description of the elements, it is considered desirable to briefly describe the operation of the whole machine to corelate the various parts thereof.

The stock of material 25 is fed either from a reel or over the conveyor 26 at a substantially uniform rate and is intermittently drawn over the measuring belt 35 by means of the reciprocating rack 39 and the ratchet mechanism associated therewith, the stroke of the rack being adjustable by means of the variable radius crank 57 to produce the desired length of stock at each operation. During this stock feeding operation the mutilated gears 98 and 99 do not transmit motion to the shaft 97 which traverses the cutting mechanism, which is therefore stationary during the feeding operation and performs both its cutting and return stroke during the return or idle stroke of the rack 39. The cutoff carriage 69 is operated by a quick return sliding lever type of motion provided with an adjustable stroke to save time when cutting narrow widths of material. The lengths of stock are fed out onto a receiving conveyor 126 during the feeding operation so that when each length is severed, it is largely supported by the conveyor and the severed end is not apt to flop around especially as rollers are provided to hold the end until the feeding mechanism advances the stock again, at the same time carrying the severed length entirely over onto the conveyor, which is operated intermittently in unison with the feeding mechanism to avoid pull on the stock.

It will thus be seen that we have provided a new and improved measuring and cutting machine especially adapted to handle delicate or elastic material that must be cut accurately to length without stretching or distortion.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. In combination, a stock feeding mechanism having means for feeding predetermined lengths of stock, and a severing mechanism comprising a cutting carriage traversing the material, means carried by said carriage adapted to feed the material up to the cutter thereon, and mechanism for intermittently operating said carriage in timed relationship to said stock feeding mechanism, said carriage operating mechanism including means for varying the stroke of said carriage.

2. In a device of the class described, an endless belt adapted to advance a length of stock, a reciprocating rack, a one way clutch actuated by said rack to intermittently advance said belt and stock a predetermined distance, a cutter carriage reciprocably mounted to traverse the material, and driving means therefor including a quick return mechanism.

3. In a device of the class described, an endless belt adapted to advance a length of stock, a reciprocating rack, means for varying the stroke of said rack, a one way clutch actuated by said rack to intermittently advance said belt and stock a predetermined distance, a cutter carriage reciprocably mounted to traverse the material, and driving means therefor including a quick return mechanism.

4. In a device of the class described, an endless belt adapted to advance a length of stock, a brake associated with said belt adapted to prevent over-running thereof, a reciprocating rack, a one way clutch actuated by said rack to intermittently advance said belt and stock a predetermined distance, a cutter carriage reciprocably mounted to traverse the material, and driving means therefor including a quick return mechanism.

5. In a device of the class described, an endless belt adapted to advance a length of stock, a reciprocating rack, driving means therefor adapted to provide a slow advance and a quick return thereof, a one way clutch actuated by said rack to intermittently advance said belt and stock a predetermined distance, a cutter carriage reciprocably mounted to traverse the material, and driving means therefor including a quick return mechanism.

6. In a device of the class described, an endless belt adapted to advance a length of stock, a brake associated with said belt adapted to prevent over-running thereof, a reciprocating rack, means for varying the stroke of said rack, a one way clutch actuated by said rack to intermittently advance said belt and stock a predetermined distance, a cutter carriage reciprocably mounted to traverse the material, and driving means therefor including a quick return mechanism.

7. In a device of the class described, an endless belt adapted to advance a length of stock, a brake associated with said belt adapted to prevent over-running thereof, a reciprocating rack, driving means therefor adapted to provide a slow advance and a quick return thereof, a one way clutch actuated by said rack to intermittently advance said belt and stock a predetermined distance, a cutter carriage reciprocably mounted to traverse the material, and driving means therefor including a quick return mechanism.

8. In a device of the class described, an endless belt adapted to advance a length of stock, a reciprocating rack, a one way clutch actuated by said rack to intermittently advance said belt and stock a predetermined distance, a cutter carriage reciprocably mounted to traverse the material, driving means therefor including a quick return mechanism, and means for driving said driving means in timed relationship to the advancing means for said belt.

9. In a device of the class described, an endless belt adapted to advance a length of stock, a reciprocating rack, means for varying the stroke of said rack, a one way clutch actuated by said rack to intermittently advance said belt and stock a predetermined distance, a cutter carriage reciprocably mounted to traverse the material, driving means therefor including a quick return mechanism, and means for driving said driving means in timed relationship to the advancing means for said belt.

10. In a device of the class described, an endless belt adapted to advance a length of stock, a brake associated with said belt adapted to prevent over-running thereof, a reciprocating rack, a one way clutch actuated by said rack to intermittently advance said belt and stock a predetermined distance, a cutter carriage reciprocably mounted to traverse the material, driving means therefor including a quick return mechanism, and means for driving said driving means in timed relationship to the advancing means for said belt.

11. In a device of the class described, an endless belt adapted to advance a length of stock, a reciprocating rack, driving means therefor adapted to provide a slow advance and a quick return thereof, a one way clutch actuated by said rack to intermittently advance said belt and stock a predetermined distance, a cutter carriage reciprocably mounted to traverse the material, driving means therefor including a quick return mechanism, and means for driving said driving means in timed relationship to the advancing means for said belt.

12. In a device of the class described, an endless belt adapted to advance a length of stock, a brake associated with said belt adapted to prevent over-running thereof, a reciprocating rack, means for varying the stroke of said rack, a one way clutch actuated by said rack to intermittently advance said belt and stock a predetermined distance, a cutter carriage reciprocably mounted to traverse the material, driving means therefor including a quick return mechanism, and means for driving said driving means in timed relationship to the advancing means for said belt.

13. In a device of the class described, an endless belt adapted to advance a length of stock, a brake associated with said belt adapted to prevent over-running thereof, a reciprocating rack, driving means therefor adapted to provide a slow advance and a quick return thereof, a one way clutch actuated by said rack to intermittently advance said belt and stock a predetermined distance, a cutter carriage reciprocably mounted to traverse the material, driving means therefor including a quick return mechanism, and means for driving said driving means in timed relationship to the advancing means for said belt.

14. In a machine for cutting sheet material into strips of given lengths, a feed conveyor for intermittently feeding the sheet forward to a cutting position, an intermittently operated receiving conveyor for receiving the cut strips, a travelling cutter mechanism reciprocable transversely of the sheet fed forward by said feed conveyor, and means for moving said cutter mechanism across said sheet during periods of time when said conveyors are at rest including means for imparting a quick return movement thereto.

15. In a machine for cutting sheet material into strips of given lengths, a feed conveyor for intermittenly feeding the sheet forward to a cutting position, an intermittently operated receiving conveyor for receiving the cut strips, a travelling cutter mechanism reciprocable transversely of the sheet fed forward by said feed conveyor including rotary shear elements and means for intermittently operating said cutter mechanism during periods of time when said conveyors are at rest.

16. In a machine for cutting sheet material into strips of given lengths, a feed conveyor for intermittently feeding the sheet forward to a cutting position, an intermittently operated receiving conveyor for receiving the cut strips, a travelling cutter mechanism reciprocable transversely of the sheet fed forward by said feed conveyor including shear means and roller means in advance of said shear means for engaging the sheet being cut to prevent lateral movement or distortion of the sheet and means for intermittently operating said cutter mechanism during periods of time when said conveyors are at rest.

17. In a machine for cutting sheet material into strips of given lengths, means for feeding the sheet forward to a cutting position and travelling cutter mechanism reciprocable transversely of the sheet fed forward by said feed means for cutting said sheet into given lengths including shear means and roller means in advance of said shear means for engaging the sheet being cut to prevent lateral movement or distortion of the sheet.

18. In a machine for cutting sheet material into strips of given lengths, means for feeding the sheet forward to a cutting position and traveling cutter mechanism reciprocable transversely of the sheet fed forward by said feed means for cutting said sheet into given lengths including a reciprocable carriage, shear means thereon, roller means in advance of said shear means for engaging the sheet being cut to prevent lateral movement or distortion of the sheet, and drive means carried by said carriage common to both said shear and roller means.

19. In a machine for cutting sheet material into strips of given length, a feed conveyor for intermittently feeding the sheet forward to a cutting position, intermittently operated receiving means for receiving the cut strips, a traveling cutter mechanism reciprocable transversely of the sheet fed forward by said feed conveyor and means for moving said cutter mechanism across said sheet during periods of time when said feed conveyor and receiving means are at rest, said receiving means including a longitudinal main conveyor and an auxiliary conveyor disposed over an end thereof directly under the cutting position for transmitting the cut strips to said main conveyor, said main and auxiliary conveyors being driven in synchronism.

20. In a machine for cutting sheet material into strips of given lengths, means for feeding the sheet forward to a cutting position, means for cutting said sheet at said position into strips of given lengths and means for intermittently operating said cutting means including gear elements in mesh for a predetermined portion of a given rotation of one of said gear elements and brake means operative during the remaining portion of said given rotation to prevent any movement of said cutting means.

21. In a machine for cutting sheet material into strips of given lengths, means for feeding the sheet forward to a cutting position, means for cutting said sheet at said position into strips of given lengths and means for intermittently operating said cutting means including gear elements in mesh for a predetermnied portion of a given rotation of one of said gear elements, a brake shoe and a brake element having a curved surface in engagement with said shoe during the remaining portion of said given rotation to prevent any movement of said cutting means.

22. In a machine for cutting sheet material into strips of given lengths, means for feeding the sheet forward to a cutting position, means for cutting said sheet at said position into strips of given lengths and means for intermittently operating said cutting means including gear elements in mesh for a predetermined portion of a given rotation of one of said gear elements and brake means automatically brought into play during the remaining portion of said given rotation to prevent any movement of said cutting means, said brake means including a brake shoe connected to one of said gear elements and a segment of a disk engageable by said shoe and connected to the other of said gear elements.

In testimony whereof, we have hereunto subscribed our names.

ALFRED C. HIRSCH.
ARNOLD R. KRAUSE.